Patented Oct. 17, 1933

1,930,468

UNITED STATES PATENT OFFICE 1,930,468

PURIFICATION OF CRUDE PARAFFIN WAX

Martin Mueller-Cunradi and Robert Werner, Ludwigshafen-on-the-Rhine, Germany, assignors to Standard-I. G. Company, Linden, N. J., a corporation of Delaware No Drawing. Application July 25, 1931, Serial No. 553,212, and in Germany July 31, 1930

10 Claims. (Cl. 196—21)

The present invention relates to improvements in the purification of crude paraffin wax.

It has already been proposed to treat crude paraffin wax in the liquid form with hydrogen or gases containing or supplying hydrogen at elevated temperatures and at increased pressure, the duration of the treatment and the temperature being regulated in such a manner that the paraffin wax itself suffers substantially no cracking.

The process may be carried out in the presence of a catalyst consisting of one or more oxides or sulphides of the metals of groups 3, 4 or 6 of the periodic system, or compounds furnishing such oxides under the conditions of the process, if desired with the addition of small quantities of iron, nickel or cobalt or their oxides which have an activating effect.

We have now found that the purification of crude waxes, in particular of hydrocarbon waxes, such as paraffin wax, ozokerite or ceresin, or also other waxes, for example those substantially consisting of esters of high molecular organic acids, such as Montan wax, by treatment in the liquid state with hydrogen or gases containing or supplying hydrogen is carried out with special advantage when catalysts are employed which contain at least two of the elements selected from bismuth, vanadium and iron metal. The term "iron metal" for the purpose of the present invention comprises iron, nickel and cobalt. Thus the catalysts may contain bismuth in mixture with vanadium or one or more iron metals. Similarly vanadium or both bismuth and vanadium may be used in mixture with one or more iron metals. The said elements may also be employed in the form of compounds, in particular in the form of oxides, but also in the form of other compounds, such as sulphides, or compounds furnishing the oxides or the metals under the conditions of working, such as nitrates or carbonates or other compounds, for example ammonium vanadate or metallic organic compounds, such as those with acetyl acetone, or formates, which are converted into the metals or the oxides at temperatures up to about 500° C. Catalysts containing bismuth and at least one iron metal or bismuth, vanadium and an iron metal, are of particular advantage. The catalysts according to the present invention may also be mixed with substances comprising metals of groups 3, 4 and 6 of the periodic system. Suitable compositions are, for example, mixtures of the oxides of bismuth, cobalt, titanium and aluminium, or of the oxides of vanadium, nickel and tin, or of bismuth, cobalt and lead, or of vanadium, bismuth, iron, zirconium and chromium, or of vanadium, iron, cobalt and aluminium, or of bismuth, nickel, aluminium, titanium and molybdenum. About from 0.2 to 1 part of metals of groups 3, 4 and 6 or compounds thereof are preferably added to each part of the mixture comprising at least two elements from the group consisting of bismuth, vanadium and iron metal. The catalysts prepared according to the present invention may also be precipitated on carriers, for example silica gel or activated bleaching earth or fragments of burnt clay.

The said catalysts are characterized by especially great activity and have the advantage over the catalysts hitherto employed of having a much longer working life. In the catalysts the iron metal is preferably contained in an amount of from 1 to 50 atomic proportions to each atomic proportion of bismuth or vanadium or mixtures thereof. Those catalysts are especially advantageous which contain 2 atomic proportions of bismuth or vanadium in combination with 25 atomic proportions of an iron metal.

The process according to the present invention is carried out at elevated temperatures ranging from about 250° to 400° C., preferably from 275° to 350° C., and at elevated pressures of at least 20 atmospheres, preferably between 50 and 200 atmospheres, though also higher pressures up to 1000 atmospheres may be employed. The duration of the treatment must be shortened as the temperature is increased in order to avoid a substantial cracking of the wax. The said regulation of the treatment may be effected either by increasing or decreasing the rate of flow of the materials in cases where the materials are passed through a reaction vessel or by simply stopping the treatment in cases where it is carried out in batch operations in autoclaves. The duration of treatment also depends on the pressure in that longer durations are employed at lower pressures and also somewhat on the nature of the particular catalyst used. For example, at a pressure of about 200 atmospheres and in the presence of a catalyst containing 12 atomic proportions of nickel to each atomic proportion of bismuth the duration may be about one hour at 275° C., about 15 minutes at 300° C., and about 2 minutes at 325° C. It should be understood, however, that our invention is not limited to these specific durations of treatment but that the duration of treatment may be considerably increased or decreased.

The following examples will further illustrate the nature of this invention but the invention is not restricted to these examples.

*Example 1*

Unrefined brown paraffin wax having a melting point of 52.9° C. is led at 300° C. together with hydrogen under a pressure of 175 atmospheres over a granular catalyst which completely fills a chromium nickel steel pressure-tight tube and which has been prepared by evaporating and reducing the residue of a solution of 0.04 molecular proportion of bismuth nitrate pentahydrate (19.4 grams) and 0.5 molecular proportion of nickel nitrate hexahydrate (145.4 grams) which has been sucked into 500 grams of silica gel. The velocity of flow is so adjusted that each particle of initial material remains about 15 minutes under treatment. The paraffin wax thus treated is pure white when solid, and water-white when liquid. It is quite odourless and tasteless and melts at 53.04° C.

*Example 2*

Crude brown paraffin wax having a melting point of 53.5° C. is passed together with hydrogen at a temperature of 310° C. and at a pressure of 190 atmospheres through a pressure tube constructed of chromium-nickel-steel which is filled with a catalyst prepared by absorbing an aqueous solution of 1/25 molecular proportion of ammonium vanadate and ½ molecular proportion of nickel nitrate hexahydrate in 500 grams of silica gel and evaporating the water and subjecting the product to a reduction treatment. The velocity of flow is so adjusted that each particle of initial material remains about 10 minutes under treatment. The paraffin wax thus treated is pure white when solid, water-white when melted, odourless and tasteless and has a melting point of 53.7° C.

Wherever occurring in the specification and claims, the expression "catalyst comprising at least two elements" and related expressions are to be understood to mean a catalyst containing at least two elements in the free or combined state.

What we claim is:

1. A process for refining a crude wax which comprises treating said wax in the liquid state with a gas comprising hydrogen at a temperature between 250° and 400° C., at an elevated pressure of at least 20 atmospheres and in the presence of a mixed catalyst comprising at least two elements selected from bismuth, vanadium and iron metal and of which elements at least one is selected from the group consisting of bismuth and vanadium, and regulating the duration of the treatment and the temperature so that the wax suffers no substantial cracking.

2. A process for refining a crude hydrocarbon wax which comprises treating said wax in the liquid state with a gas comprising hydrogen at a temperature between 250° and 400° C., at an elevated pressure of at least 20 atmospheres and in the presence of a mixed catalyst comprising at least two elements selected from bismuth, vanadium and iron metal and of which elements at least one is selected from the group consisting of bismuth and vanadium, and regulating the duration of the treatment and the temperature so that the wax suffers no substantial cracking.

3. A process for refining crude paraffin wax which comprises treating said wax in the liquid state with a gas comprising hydrogen at a temperature between 275° and 350° C., at an elevated pressure of at least 20 atmospheres and in the presence of a mixed catalyst comprising at least two elements selected from bismuth, vanadium and iron metal and of which elements at least one is selected from the group consisting of bismuth and vanadium, and regulating the duration of the treatment and the temperature so that the wax suffers no substantial cracking.

4. A process for refining crude paraffin wax which comprises treating said wax in the liquid state with a gas comprising hydrogen at a temperature between 275° and 350° C., at an elevated pressure of at least 20 atmospheres and in the presence of a mixed catalyst comprising bismuth and an iron metal and regulating the duration of the treatment and the temperature so that the wax suffers no substantial cracking.

5. A process for refining crude paraffin wax which comprises treating said wax in the liquid state with a gas comprising hydrogen at a temperature between 275° and 350° C., at a pressure between 50 and 200 atmospheres and in the presence of a mixed catalyst comprising bismuth and an iron metal and regulating the duration of the treatment and the temperature so that the wax suffers no substantial cracking.

6. A process for refining crude paraffin wax which comprises treating said wax in the liquid state with a gas comprising hydrogen at a temperature between 275° and 350° C., at a pressure between 50 and 200 atmospheres and in the presence of a mixed catalyst comprising bismuth and an iron metal in conjunction with a substance comprising a metal from groups 3, 4 and 6 of the periodic system, and regulating the duration of the treatment and the temperature so that the wax suffers no substantial cracking.

7. A process for refining crude paraffin wax which comprises treating said wax in the liquid state with a gas comprising hydrogen at a temperature between 275° and 350° C., at a pressure between 50 and 200 atmospheres and in the presence of a mixed catalyst comprising bismuth and an iron metal, said catalyst being deposited on a carrier, and regulating the duration of the treatment and the temperature so that the wax suffers no substantial cracking.

8. A process for refining crude paraffin wax which comprises passing said wax at a temperature of about 300° C. together with hydrogen under a pressure of about 175 atmospheres over a catalyst consisting of a mixture of nickel and bismuth deposited on silica gel and at such a velocity of flow that each particle of the said wax remains about 15 minutes under treatment.

9. A process for refining a crude wax which comprises treating said wax in the liquid state with a gas comprising hydrogen at a temperature between 250 and 400° C., at an elevated pressure of at least 20 atmospheres and in the presence of a mixed catalyst comprising at least two oxides selected from the class consisting of bismuth, vanadium and iron metal oxides, and at least one oxide of which is selected from the group consisting of bismuth and vanadium oxides, and regulating the duration of the treatment and the temperature so that the wax suffers no substantial cracking.

10. A process for refining a crude wax which comprises treating said wax in the liquid state with a gas comprising hydrogen at a temperature between 275 and 350° C., at an elevated pressure of at least 20 atmospheres and in the presence of a mixed catalyst comprising the oxides of bismuth and nickel, and regulating the duration of the treatment and the temperature so that the wax suffers no substantial cracking.

MARTIN MUELLER-CUNRADI.
ROBERT WERNER.